(12) United States Patent
Johnston et al.

(10) Patent No.: US 9,161,493 B2
(45) Date of Patent: Oct. 20, 2015

(54) REMOVABLE CORN SHELLER DISCHARGE GATE ASSEMBLY

(71) Applicant: BRATNEY COMPANIES, Des Moines, IA (US)

(72) Inventors: Thomas Robert Johnston, Altoona, IA (US); John Calvert Cosner, Altoona, IA (US); Stuart Henry Ault, Altoona, IA (US)

(73) Assignee: Bratney Companies, Des Moines, IA (US)

( * ) Notice: Subject to any disclaimer, the term of this patent is extended or adjusted under 35 U.S.C. 154(b) by 109 days.

(21) Appl. No.: 13/713,860

(22) Filed: Dec. 13, 2012

(65) Prior Publication Data

US 2014/0171162 A1   Jun. 19, 2014

(51) Int. Cl.
*A01F 11/06* (2006.01)

(52) U.S. Cl.
CPC ........................................ *A01F 11/06* (2013.01)

(58) Field of Classification Search
CPC ......... A01F 11/06; A01F 12/00; A01F 12/44; A01F 12/442; A01F 12/4428; A01F 12/448; B02B 3/04
USPC .............................................. 56/13.3; 460/45
See application file for complete search history.

(56) References Cited

U.S. PATENT DOCUMENTS

| 1,365,228 | A | * | 1/1921 | Davidson | 241/225 |
|---|---|---|---|---|---|
| 1,567,517 | A | * | 12/1925 | Kisbey | 188/321.11 |
| 1,722,428 | A | * | 7/1929 | Kan et al. | 16/50 |
| 1,943,284 | A | * | 1/1934 | Binau | 56/13.3 |
| 1,968,998 | A | * | 8/1934 | Elliott | 56/13.5 |
| 2,538,914 | A | * | 1/1951 | Rosenthal | 460/18 |
| 2,681,468 | A | * | 6/1954 | Quinn | 16/52 |
| 2,801,013 | A | * | 7/1957 | Pilch | 414/695.6 |
| 3,423,910 | A | * | 1/1969 | Takatsugu et al. | 56/13.3 |
| 4,143,665 | A | * | 3/1979 | Griffin | 460/104 |
| 4,779,527 | A | * | 10/1988 | Ardueser et al. | 100/88 |
| 4,802,327 | A | * | 2/1989 | Roberts | 56/15.2 |
| 5,784,740 | A | * | 7/1998 | DiSieno et al. | 14/71.3 |
| 6,540,604 | B1 | * | 4/2003 | Parekh et al. | 454/121 |
| 7,121,004 | B1 | * | 10/2006 | Shoup | 29/897.312 |
| 7,125,067 | B2 | * | 10/2006 | Bonnett et al. | 296/146.6 |
| 2006/0131118 | A1 | * | 6/2006 | Huang | 188/313 |
| 2006/0229119 | A1 | * | 10/2006 | Wamhof et al. | 460/101 |
| 2009/0280876 | A1 | * | 11/2009 | Yoder et al. | 460/100 |

* cited by examiner

*Primary Examiner* — Thomas B Will
*Assistant Examiner* — Joan D Misa
(74) *Attorney, Agent, or Firm* — Zarley Law Firm, P.L.C.

(57) ABSTRACT

A removable discharge gate assembly for a corn shelling machine having a discharge gate rotatably mounted to the machine, a bracket mounted to the machine, and a shock absorber mounted to and extending between the gate and the bracket.

11 Claims, 2 Drawing Sheets

REMOVABLE CORN SHELLER DISCHARGE GATE ASSEMBLY

BACKGROUND OF THE INVENTION

This invention is directed to a discharge gate assembly for a corn shelling machine and more particularly to a discharge gate assembly that is removable and reduces damage to the discharge gate.

Corn shelling machines are well known in the art. Typically, to provide closing tension on a discharge gate, a weighted bar is attached to the end of a rotatable shaft of the discharge gate, that is also attached to a shock absorber connected to the outside of the shelling machine. While closing tension is provided by these devices, the discharge gates have a tendency to fracture along the shaft or break at the connection point of the weighted bar. Accordingly, there is a need in the art for a device that addresses these deficiencies.

Therefore, an objective of this invention is to provide a discharge gate assembly that provides improved support to the discharge gate under tension.

Another objective of the present invention is to provide a discharge gate assembly that is easy to remove.

These and other objectives will be apparent to one of ordinary skill in the art based upon the following written description, drawings and claims.

SUMMARY OF THE INVENTION

A removable discharge gate assembly having a housing with an open bottom and a shock absorber mounted to the housing and a discharge gate. The discharge gate is mounted to a rotatable shaft such that as shelled cobs apply sufficient pressure against the gate the shock absorber will contract and as the pressure is reduced the shock absorber will expand to move the gate toward a closed position.

DETAILED DESCRIPTION OF THE PREFERRED EMBODIMENTS

Figure 1:
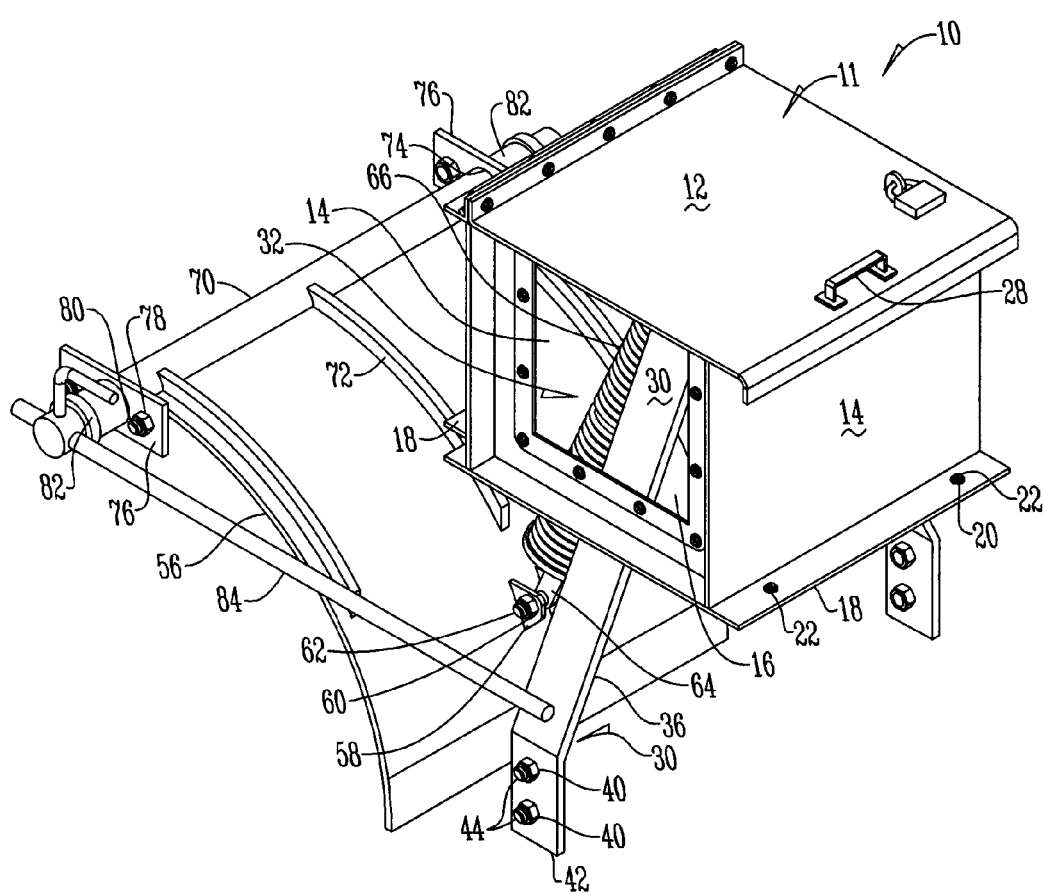
FIG. 1 is a perspective view of a discharge gate assembly.
Figure 2:
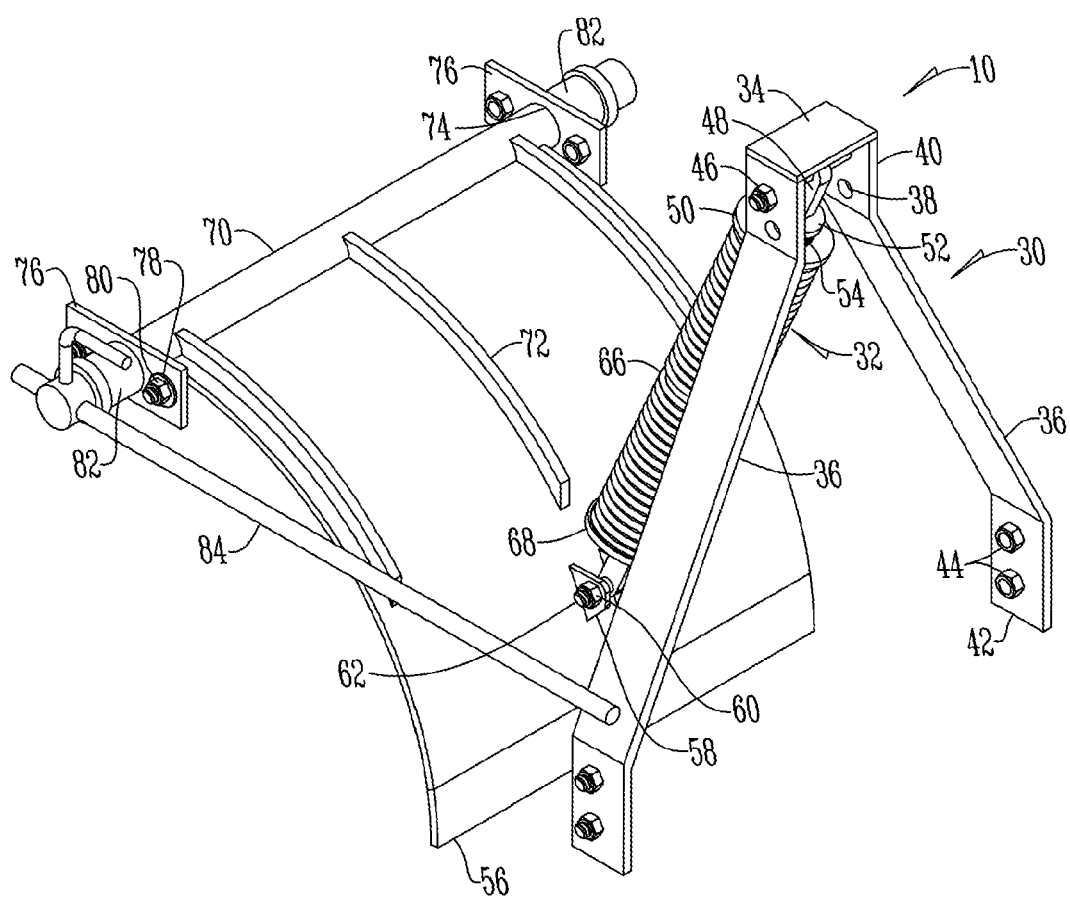
FIG. 2 is a perspective view of a discharge gate assembly.

Referring to the Figures, a removable corn sheller discharge gate assembly 10 includes a housing 11 having a top wall 12, sidewalls 14 and an open bottom 16. The top wall 12 is pivotally connected to sidewall 14. Preferably, at least one sidewall 14 has a window. Extending outwardly from the sidewalls 14 adjacent the bottom 16 are flanges 18 having a plurality of apertures 20. The apertures receive bolts 22 that are used to removably connect the housing 11 to a corn shelling machine 26. The top wall 12 preferably has a handle 28 to assist in opening the top wall 12.

Disposed within the housing 11 is a bracket 30 for mounting a shock absorber 32. The bracket 30 has a top portion 34 and a pair of support arms 36 that angle outwardly from the top portion 34 to generally form an upside down V. The arms 36 extend beyond the bottom 16 of the housing 11. A plurality of openings 38 are positioned at the top 40 and bottom ends 42 of the support arms 36. The openings 38 at the bottom ends 42, receive bolts 44 that connect the bracket 30 to machine 26. The openings 38 at the top ends 40 receive a bolt 46 that extends through a mounting ring 48 connected to the shock absorber 32.

The shock absorber 32 is of any type and preferably is an oil filled dummy shock absorber. The mounting ring 48 is connected to a threaded nut 50 that is received by a threaded cylinder 52. A piston 54 is slidably received within the cylinder 52 to form a sealed fluid chamber. The piston 54 is connected to a discharge gate/door 56. As an example, a bracket 58 having aligned openings 60 extends outwardly from the door 56. A bolt 62 extends through the openings 60 and a mounting ring 64 that is attached to the piston 52. A compression spring 66 fits over the cylinder 52 and the piston 54 between the threaded nut 50 and a shoulder 68 at the end of the piston 54.

The door 56 is attached to a shaft 70 that is pivotally mounted to the machine 26. Preferably the door 56 is arcuate in shape having a plurality of ribs 72 that extend from shaft 70 along an outer surface of the door 56.

The shaft 70 extends through central openings 74 of mounting brackets 76. The mounting brackets 76 have a plurality of apertures 78 that receive bolts 80 to mount the brackets 76 to machine 26. A pair of bearings 82 fit over shaft 70 and are attached to brackets 76 outside of brackets 76 away from door 56. Finally, a handle 84 is connected to the end of shaft 70 to permit manual opening of door 56.

In operation, assembly 10 is connected to machine 26. More specifically, arms 36, flanges 18, and mounting brackets 76 are all connected to the machine 26 with bolts. As the corn shelling machine 26 operates, shelled cobs will be positioned at the end of the machine 26 in front of door 56. As the shelled cobs accumulate, the shelled cobs apply sufficient pressure against the door 56 to compress the shock absorber 32 to permit shelled cobs to pass through the door 56. As the pressure from the shelled cobs decreases the shock absorber 32 pushes the door 56 back toward a closed position. The resisting tension of the shock absorber 32 is increased or decreased by rotating the threaded nut 50 toward or away from piston 54.

Accordingly, a removable cob sheller discharge gate assembly has been disclosed that, at the very least, meets all the stated objectives.

What is claimed is:

1. A removable discharge gate assembly for a corn shelling machine, comprising:
    an arcuate discharge gate having a plurality of ribs rotatably mounted to a corn shelling machine;
    a bracket connected to the corn shelling machine having a top portion and a pair of support arms the angle outwardly from the top portion of the bracket to generally form an upside down V; and
    a shock absorber connected to and extending between the discharge gate and the bracket.

2. The assembly of claim 1 wherein the shock absorber is an oil filled dummy shock absorber.

3. The assembly of claim 1 further comprising a housing removably connected to the corn shelling machine.

4. The assembly of claim 3 wherein the bracket is partially disposed within the housing.

5. The assembly of claim 3 wherein the housing having a top wall, sidewalls, and an open bottom connected to the bracket.

6. The assembly of claim 5 wherein at least one sidewall has a window.

7. The assembly of claim 5 further comprising a flange that extends outwardly from the sidewalls adjacent a bottom of the housing.

8. The assembly of claim 7 wherein the flange has a plurality of apertures.

9. The assembly of claim 1 wherein the discharge gate is attached to a shaft that is pivotally mounted to the machine.

10. The assembly of claim 9 wherein a handle is attached to an end of the shaft.

11. The assembly of claim 1 further comprising openings at the top and bottom of the pair of support arms.

\* \* \* \* \*